US006411042B1

(12) United States Patent
Cull et al.

(10) Patent No.: US 6,411,042 B1
(45) Date of Patent: Jun. 25, 2002

(54) DISPLAY COLD SPOT TEMPERATURE REGULATOR

(75) Inventors: Brian David Cull; Dennis Michael Davey, both of Glendale; Alan Stuart Feldman, Phoenix, all of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/476,398

(22) Filed: Dec. 29, 1999

(51) Int. Cl.[7] .................................................. C02F 1/32

(52) U.S. Cl. ....................... 315/115; 315/118; 250/437; 250/438

(58) Field of Search ........................... 315/112–118, 94, 315/101, 104–108; 250/436–438

(56) References Cited

U.S. PATENT DOCUMENTS 4,751,551 A * 6/1988 Beiter et al. .................. 355/30
4,780,901 A * 10/1988 Gabbay et al. ............. 378/141
4,841,557 A * 6/1989 Haberrecker et al. ....... 378/141
5,229,842 A * 7/1993 Dolan et al. ................ 315/118
5,343,116 A 8/1994 Winsor ........................ 313/493
5,675,153 A * 10/1997 Snowball .................... 250/438
5,808,418 A 9/1998 Pitman et al. .............. 315/115

* cited by examiner

*Primary Examiner*—David Vu
*Assistant Examiner*—Wilson Lee

(57) ABSTRACT

An apparatus and method is disclosed for regulating the cold spot temperature of a light emitting enclosure. A cold spot regulation system defines and controls the temperature of the cold spot. The cold spot regulation system includes an interface housing secured to the light emitting enclosure and two ducts extending from the interface housing. The cold spot regulation system uses a coolant fluid to lower the operating temperature of the light emitting enclosure. The coolant fluid is diverted into one of the ducts. The coolant fluid is passed by the cold spot of the light emitting enclosure and released out the other duct.

22 Claims, 4 Drawing Sheets

DISPLAY COLD SPOT TEMPERATURE REGULATOR

FIELD OF INVENTION

The present invention relates generally to displays and, more particularly, to backlighting systems for displays.

BACKGROUND OF THE INVENTION

Backlighting an electronic display is a common need for many industries. For example, in the aviation and space industry, the backlit liquid crystal display (LCD) offers display luminance efficiency, contrast ratio and display viewing angles comparable to the once commonly used cathode ray tube (CRT). In addition, unlike CRTs, backlit LCDs provide a compact design with low power requirements, thus making the backlit LCD particularly suited for avionics displays.

Typically, the LCD is backlit using a fluorescent discharge lamp in which light is generated by an electric discharge in a gaseous medium. A conventional fluorescent lamp configured for backlighting a display includes a serpentine fluorescent lamp tube positioned within an interior region of a lamp housing called the backlight cavity. Filaments are mounted within free end portions of the lamp tube. Alternating current (AC) power is provided to the filaments through leads from a power supply. The lamp tube is charged with a mixture of mercury vapor and noble gas and the inner surface of the lamp tube is coated with phosphor.

When the fluorescent lamp is turned on, an electric field inside the lamp tube is produced which ionizes the noble gas. Free electrons become accelerated by the electric field and collide with the mercury atoms. As a result, some mercury atoms become excited to a higher energy state without being ionized. As the excited mercury atoms fall back from the higher energy state, they emit photons, predominately ultraviolet (UV) photons. These UV photons interact with the phosphor on the inner surface of the lamp tube to generate visible light.

The intensity of the visible light generated by the fluorescent lamp depends on the mercury vapor partial pressure in the lamp tube. At a mercury pressure less than the optimum mercury pressure, the light intensity of the fluorescent lamp is less than maximum because the mercury atoms produce fewer UV photons. At a mercury pressure greater than the optimum mercury pressure, the light intensity of the lamp is also less than maximum because so many mercury atoms tend to collide with the UV photons generated by other mercury atoms. Some of these UV photons fail to reach the phosphor coated inner surface and therefore do not generate visible light.

Nonetheless, many manufacturers fill the lamp tube with excess mercury so as to extend the light-output life for several years. As the lamp is burning, the mercury inside the lamp tends to be absorbed into the phosphor lining. The lost mercury is replenished from the excess mercury vapor stored in the lamp. If surplus mercury vapor is released into the lamp, however, the lamp performance diminishes. Therefore, it is desirable to maintain a reservoir within the lamp tube that holds the excess mercury until it is needed.

The mercury vapor pressure increases with the temperature of the coldest location (commonly known as "the cold spot") inside the lamp tube. The cold spot serves as a point for the excess mercury to coagulate (i.e., the cooler the spot, the greater the attraction of mercury). For many avionics applications, the optimal cold spot temperature for the most favorable mercury pressure within the lamp tube is approximately 55° C. To insure that the visible light output of the fluorescent lamp is at a maximum with the least amount of power consumption, it is desirable to regulate the cold spot temperature of the lamp tube to maintain the optimal cold spot temperature.

One known method of regulating the cold spot temperature of the lamp tube is by a thermoelectric cooler (TEC). The typical TEC combines a metal heat sink, a resistive heater, and a diode array. A piece of copper or similar metal is fitted against the foot of the lamp body to form a "cold shoe." The metal extends to the resistive heater and the diode array consisting of a number of individual diodes. A direct current is applied to the TEC, which causes one side to heat up, and the side near the lamp to cool down. This method is an effective way of accelerating the natural heat sinking, process.

The TEC usually adequately regulates the cold spot temperature. Nonetheless, the diode arrays tend to be extremely fragile. The diode array should be rugged enough to avoid cracking and fracturing under vibrational loads to which aircraft and spacecraft are commonly subjected, which increases the cost of such arrays. Further, the display should be configured to avoid forces applied to the rigid metal of the cold shoe that is attached to the fragile lamp which could damage the TEC and the lamp. In addition, the TEC design requires additional electronics that tend to occupy display space and increase costs. Further, a significant amount of power may be needed to drive the TEC cooling element.

U.S. Pat. No. 5,808,418, issued Sep. 15, 1998 to Pitman et al., discloses replacing the TEC with a cylindrical glass tube connected to the lamp body. Referring to FIG. 1, a first portion 100 of the tube is exposed to the internal gas pressure of a lamp body 160. A second portion 110 extends outside the housing 120 (backplate) and has a closed end 130. A heating wire 140 is wrapped around the second portion 110 of the tube and controlled by a power supply (not shown). A temperature sensor 150 is mounted on the first portion 100 of the glass tube and coupled to the power supply (not shown).

In operation, the cylindrical tube cools the lamp body 160 by positioning the second portion 130 in cooler air outside the interior of the display. Beyond the backplate 120, outside air circulates, typically from small holes in the airplane fuselage. The extended portion 110 of the tube is cooled by the outside air and thus defines a cold spot for the lamp. The temperature sensor 150 monitors the temperature of the tube near the lamp. If the temperature is below the optimal cold spot temperature range, the sensor 150 energizes the power supply (not shown) so as to deliver power to the heater wire 140. The sensor 150 continually monitors the temperature of the tube 100 and controls, in a feedback loop, the operation of the power supply (not shown) to the heater wire 140.

In another embodiment of the Pitman system, illustrated in FIG. 2, the cylindrical glass tube is replaced by a tin plated copper post 200 having cooling fins 210 attached to the extended portion 220. The post 200 is attached to the fragile lamp body 160 by a thermally conductive silicone adhesive 230. In operation, the copper post behaves substantially identical to the glass cylindrical tube of FIG. 1.

The Pitman system alleviates the need for a TEC, but remains prone to some of the disadvantages associated with the TEC. In particular, the class cylindrical tube is extremely fragile. Unlike the TEC, the glass tube is open to the internal gases within the fluorescent lamp. Damage to the glass tube necessarily damages the lamp because the glass tube is an integral part of the original lamp body complete with internal lamp gases. If the glass tube breaks while in operation (i.e., in aircraft flight), the entire lamp and the whole display system would be rendered inoperable. While the copper post embodiment may be more resistant to breakage, the rigidity of the post could break the lamp if enough force is applied to the post. Accordingly, the display systems are typically subject to design constraints to minimize potential breakage.

SUMMARY OF THE INVENTION

The present invention overcomes the problems outlined above and provides for an improved backlighting system for displays and method for regulating the cold spot temperature of a fluorescent lamp. The system comprises a light emitting enclosure having a defined cold spot. A duct disposed through a backplate is connected to a coolant fluid source at one end and exposed to the cold spot at a second end. Coolant fluid may be allowed to pass by the cold spot.

In an exemplary embodiment, a cold spot regulation system includes an interface housing positioned adjacent to the cold spot and two ducts connected to the interface housing. An intake duct includes an intake end configured to receive a coolant fluid flow and an exhaust duct configured to release the coolant fluid flow. The system may include an inexpensive shock-resilient material that can withstand the vibrations that are common to the aircraft cockpit.

In one embodiment, the system comprises a heating mechanism contiguous with the cold spot mechanism. The heating mechanism may be controlled by a power supply that receives commands from a control circuit. The system may further include a temperature sensor suitably located to monitor the temperature of the cold spot. Temperature readings are supplied to the control circuit. The control circuit energizes the power supply to the heating mechanism as needed to reach an optimum operating temperature.

In yet another embodiment, the heating mechanism comprises a conductive wire wrapped around the light emitting enclosure near the cold spot. In still another embodiment, the heating mechanism comprises a thin film resistive heater that is adhered to the enclosure. The heating mechanism may further comprise an airflow regulation device. The device is designed to open and close the end of the intake duct suitably configured to receive a coolant fluid flow. In operation, the temperature sensor monitors the cold spot temperature and through a control circuit increases or reduces the amount of coolant flow reaching the cold spot.

In still another embodiment, the end of the intake duct that is suitably configured to receive a fluid flow is constricted to form a Venturi tube.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention relates to an improved cooling system and method for regulating the cold spot temperature of a fluorescent lamp. Although the cooling mechanism may be suitable for fluorescent lamps in many different industries, the present invention is conveniently described with reference to the avionics and spacecraft industry, and more particularly to the electronic display systems in the cockpit.

Figure 2:
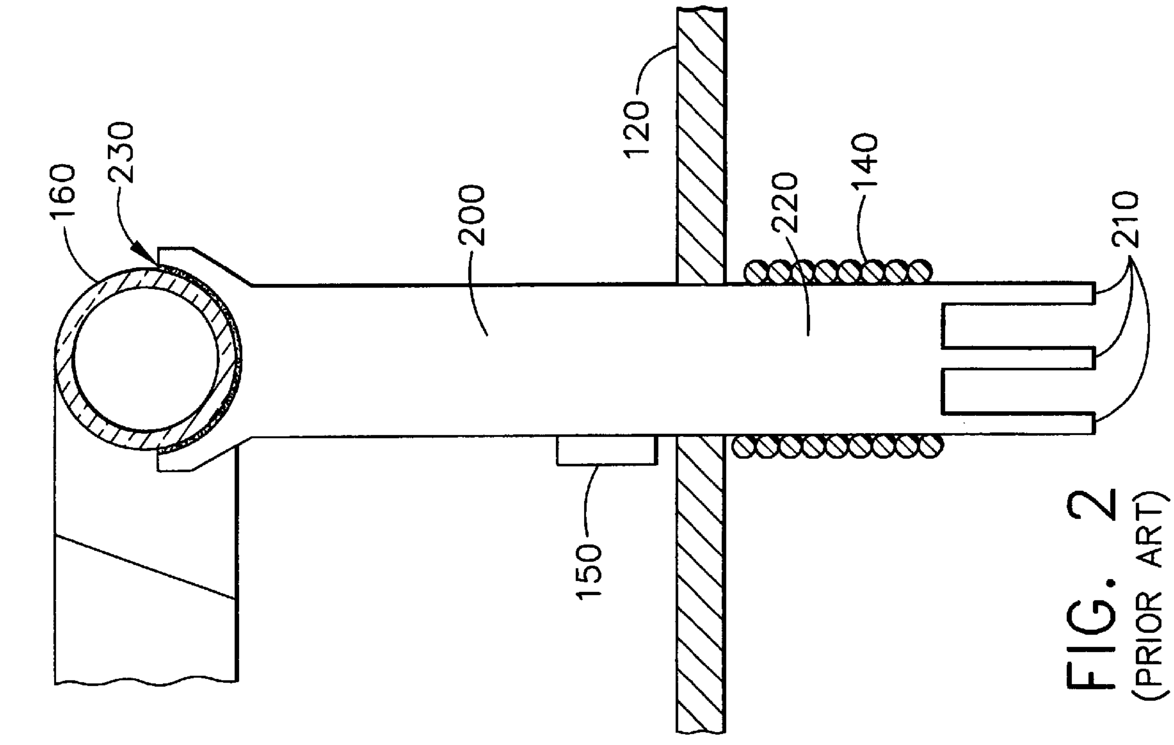
FIG. 2 (PRIOR ART)
FIG. 2 illustrates an enlarged cross sectional view of an embodiment of the cooling system of the prior art incorporating a tin plated copper post.
Figure 1:
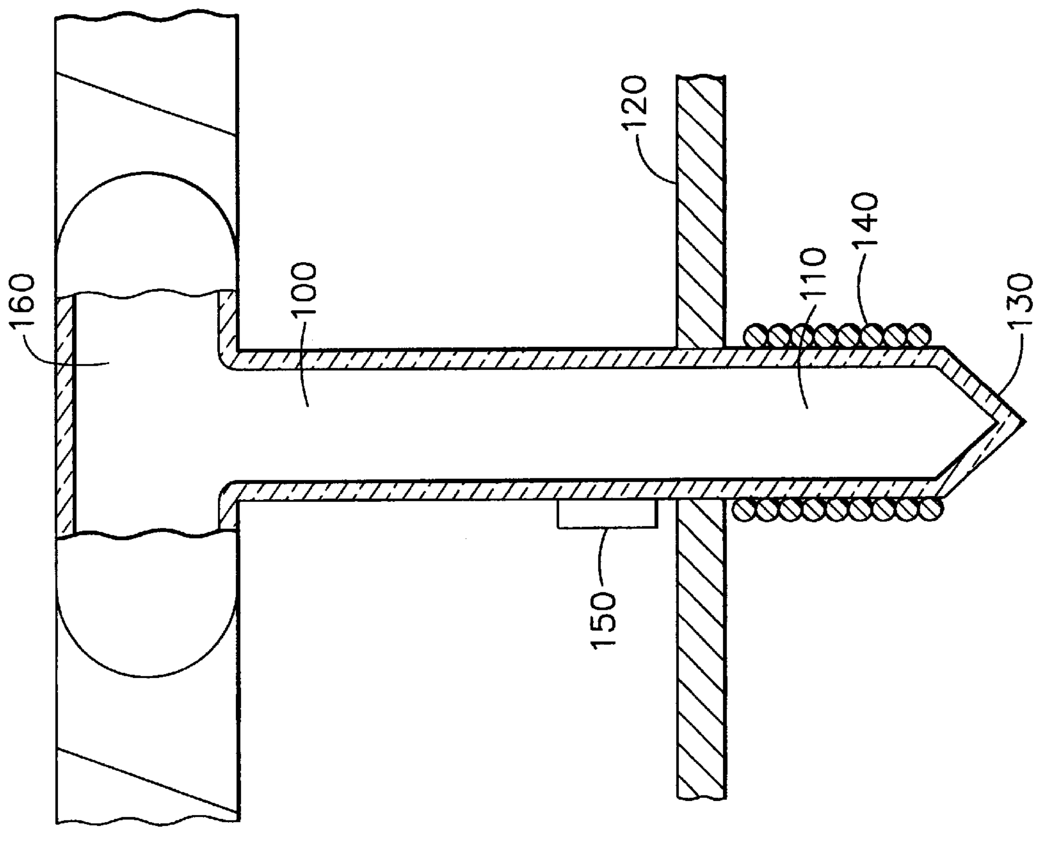
FIG. 1 (PRIOR ART)
FIG. 1 illustrates an enlarged cross sectional view of the cooling system of the prior art incorporating a cylindrical glass tube.
Figure 4:
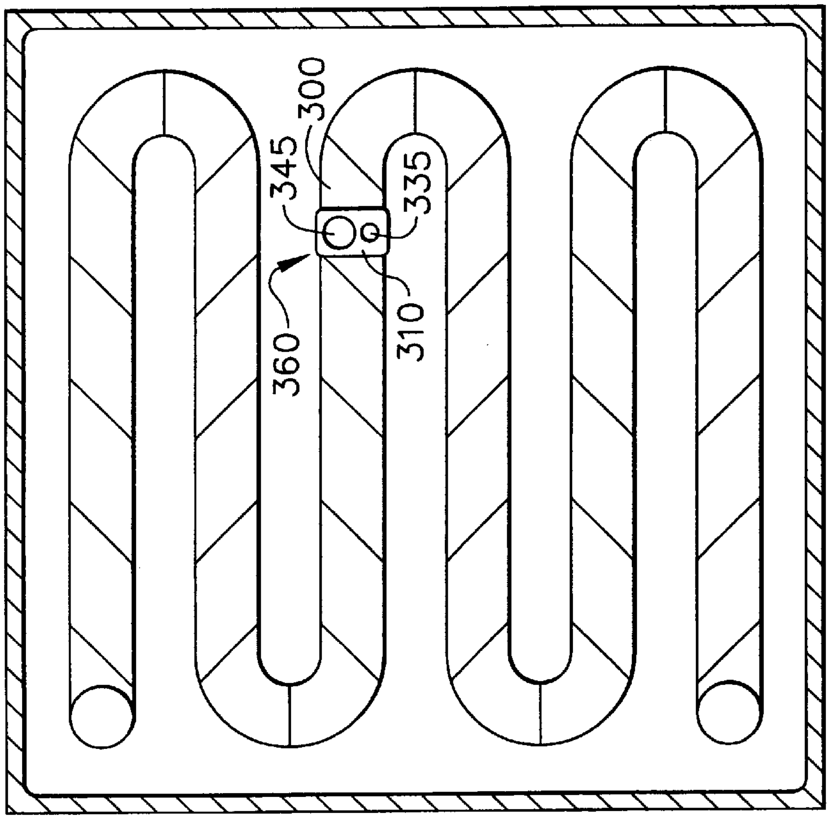
FIG. 4 illustrates a plane view of a serpentine fluorescent lamp tube and the cooling system of FIG. 3.
Figure 3:
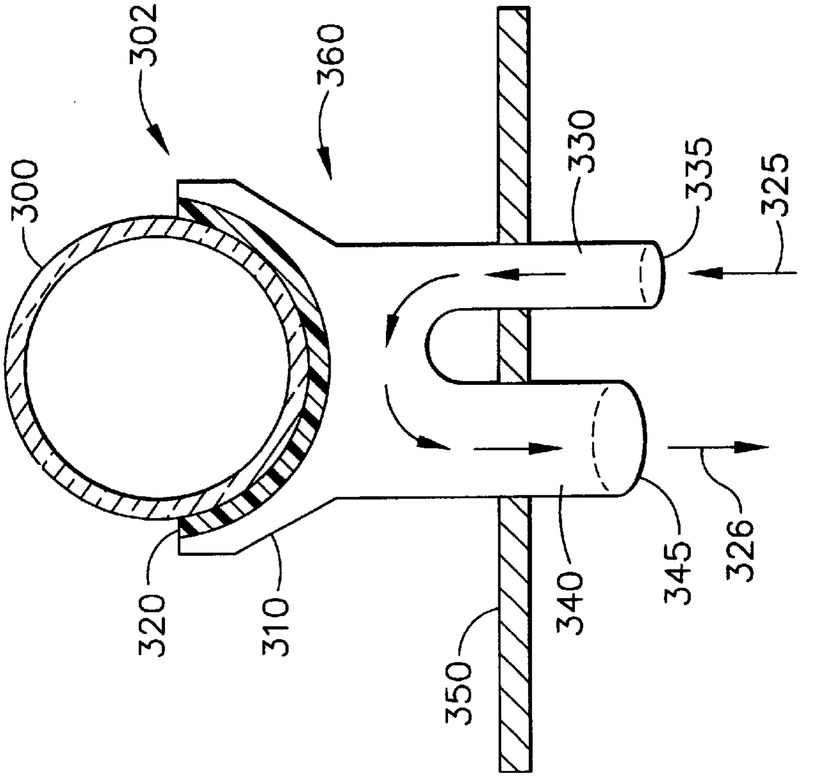
FIG. 3 illustrates an enlarged cross sectional view of the cooling system of the present invention.

Referring now to FIGS. 3 and 4, a display backlight system according to various aspects of the present invention comprises: a light emitting enclosure 300 having a desired cold spot; a backplate 350 positioned near the light emitting enclosure 300; and a cold spot regulation system 302. The cold spot regulation system 302 suitably comprises a cold spot cooling system 360 adjacent the lamp body 300. The cold spot cooling system 360 is suitably disposed at the point of the lamp body 300 at which the cold spot is desired within the fluorescent lamp.

In an exemplary embodiment, the cold spot cooling, system 360 comprises: a source of coolant fluid 325; an intake duct 330 disposed through the backplate 350 and having a first end connected to the source of coolant fluid 325 and a second end exposed to the light emitting enclosure 300; and an exhaust duct 340 disposed through the backplate 350 and having a first end exposed to the light emitting disclosure 300 and a second end connected to an exhaust area 326. The ends of the ducts 330, 340 exposed to the light emitting disclosure 300 may be coincident such that the coolant fluid is delivered to the light emitting enclosure 300 by the intake duct 330, circulates near the desired cold spot of the light emitting enclosure 300, and is removed by the exhaust duct 340.

The light emitting enclosure 300 selectably emits light and includes a desired cold spot. In the present embodiment, the light emitting enclosure 300 comprises a fluorescent lamp, such as a conventional serpentine fluorescent lamp used in avionics displays. The light emitting enclosure 300 may comprise, however, any suitable fluorescent lamp or other light emitting enclosure, such as a flat fluorescent lamp, described in U.S. Pat. No. 5,343,116, issued Aug. 30, 1994, to Winsor. The light emitting enclosure suitably includes an interior for containing the light emitting materials and an exterior surface, a portion of which is designated for the desired cold spot. The cold spot may be designated according to any appropriate criteria, such as accessibility or visibility.

The backplate 350 separates the light emitting enclosure 300 from various other components, such as the source of coolant fluid 325. In the present embodiment, the backplate 350 comprises a backing behind the light emitting enclosure 300 and opposite a display for reflecting light through the display towards the viewer. The backplate 350 may serve various other functions, such as a mounting surface for supporting the light emitting enclosure 300 and the ducts 330, 340.

The source of coolant fluid 325 comprises a source of relatively cool fluid, gas or liquid, for cooling the cold spot on the light emitting enclosure 300. Any appropriate source of coolant fluid, and any suitable coolant fluid, may be used. In the present avionics application, the source of coolant fluid suitably comprises an airflow from outside the aircraft. For example, perforations in the nose of the aircraft allow air to circulate within selected portions of the fuselage. The forced air provides an efficient source of cooling for the cockpit electronics, including the electronic display systems. The source of coolant fluid may comprise, however, any suitable supply of coolant.

The intake duct 330 is disposed through the backplate 350 to supply coolant fluid from the source of the coolant fluid 325 to the cold spot associated with the light emitting enclosure 300. The intake duct 330 suitably comprises a hollow tube having two open ends. The first end is open to the source of the coolant fluid 325 and the second end is open and adjacent to the cold spot associated with the light emitting enclosure 300. Similarly, the exhaust duct 340 is disposed through the backplate 350 to draw spent coolant fluid from the cold spot associated with the light emitting enclosure 300 and transfer it to the exhaust area 326, such as back into the airflow from the perforations in the fuselage. Exhaust duct 340 suitably comprises a hollow tube having two open ends. The first end is open and adjacent to the cold spot associated with the light emitting enclosure 300, and the second end is open to the exhaust area 326.

In the present embodiment, the cold spot cooling system 360 combines the intake duct 330 and the exhaust duct 340 into a single unit having a substantially continuous flow of coolant fluid from the intake duct 330, across the cold spot, and out the exhaust duct 340. The cold spot mechanism 360 includes the intake duct 330 and the exhaust duct 340 extending from an interface housing 310. The interface housing 310 abuts the light emitting enclosure 300 to allow the coolant fluid to contact the light emitting enclosure 300 or an interface between the coolant fluid and the light emitting enclosure 300. In the present embodiment, the interface housing 310 has an opening formed in the surface adjacent the cold spot of the light emitting enclosure 300 to allow the coolant fluid to directly contact the exterior surface of the light emitting enclosure 300. The interface housing 310 of the cold spot mechanism 360 is preferably shaped to fit snugly around the lamp body 300. A sealant 320 may be applied joining the light emitting enclosure 300 to the interface housing 310. The sealant 320 also inhibits coolant fluid flow from penetrating into other parts of the enclosure. A commercially available two-part thermally conductive epoxy, for example ECCOSIL™, may be used as an adhesive for sealant 320.

The duct 330, 340 are suitably integrally formed into the interface housing 310 so that the interface housing 310 and the ducts comprise a single unit. Both ducts 330, 340 extend through the housing or backplate 350, and a sealant (not shown) may be applied between the backplate 350 and the exterior surfaces of the ducts 330, 340. The intake duct 330 is suitably configured to receive airflow through an intake end 335. The exhaust duct 340 is suitably substantially contiguous with the intake duct 330 and is suitably designed to release the fluid flow through an exhaust end 345. For a conventional avionics display, intake end 335 and exhaust end 345 are suitably one to three centimeters in diameter. In the present embodiment, the intake end 335 is slightly smaller in diameter than the exhaust end 345. By widening the exhaust end 345 in relation to the intake end 335, back pressure caused by the warm released air and the effects from eddy currents may be decreased.

The cold spot cooling system 360 is suitably constructed of an appropriate material for the application. For example, in the present embodiment, the cold spot cooling system 360 comprises a thermally conductive and temperature resilient material. To achieve maximum thermal efficiency, it is desirable to form the cold spot cooling system 360 from a material that effectively transfers heat from the lamp body 300 and more particularly from the cold spot on the lamp body. Further, the material preferably withstands a wide range of temperatures, for example from −40° C. to 120° C. Various kinds of metals, plastics, resins, hard rubbers, synthetic rubbers, or other flexible yet durable materials may be used to form the cold spot cooling system 360. In the present embodiment, the cold spot cooling system 360 is suitably configured to support the light emitting enclosure 300 on the backplate 350. Accordingly, the cold spot cooling system 360 preferably comprises a durable and resilient material which tends to absorb shocks and vibrations attendant to flight.

To provide greater temperature control, the cold spot regulation system 302 may further include a heating system in addition to the cold spot cooling system 360. Additional heating capability allows a particular desired temperature to be maintained. For example, in many applications, the optimal operating temperature of an avionics display lamp is around 55° C. Thus the optimal temperature of the cold spot is slightly below 55° C. Accordingly, a heating mechanism may be implemented to offset the cooling performed by the cold spot cooling system 360.

Figure 6:
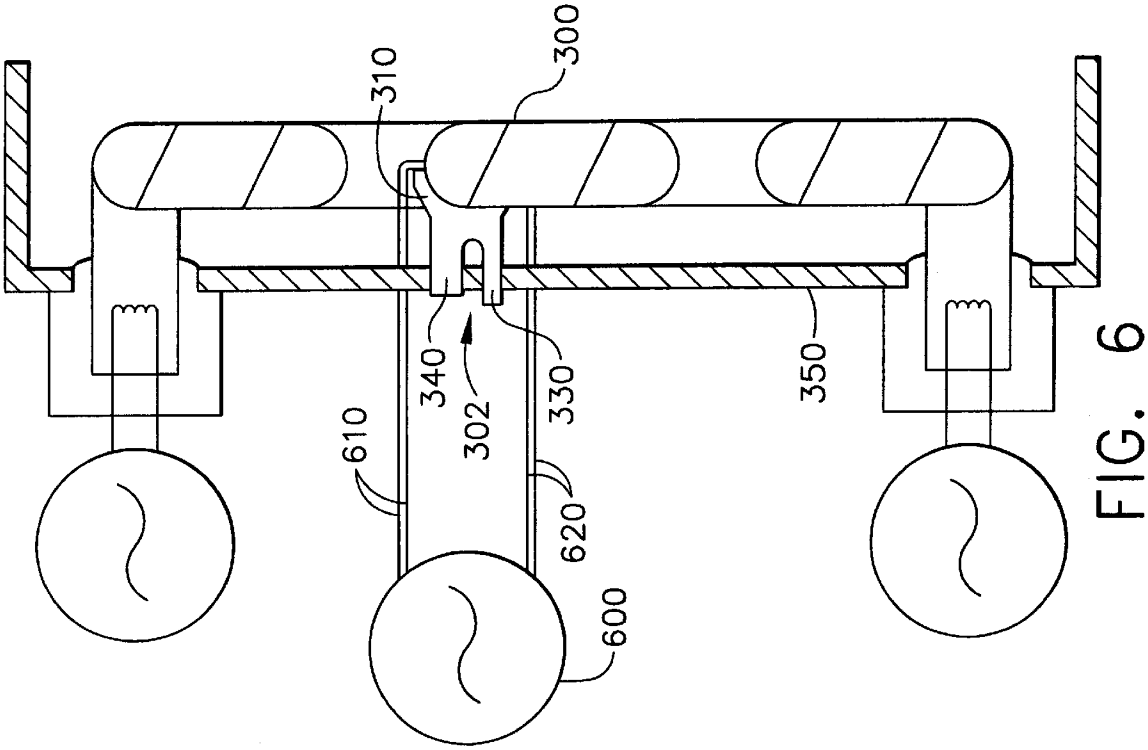
FIG. 6 illustrates a sectional view of a fluorescent discharge lamp incorporating the cooling system of FIG. 5.
Figure 5:
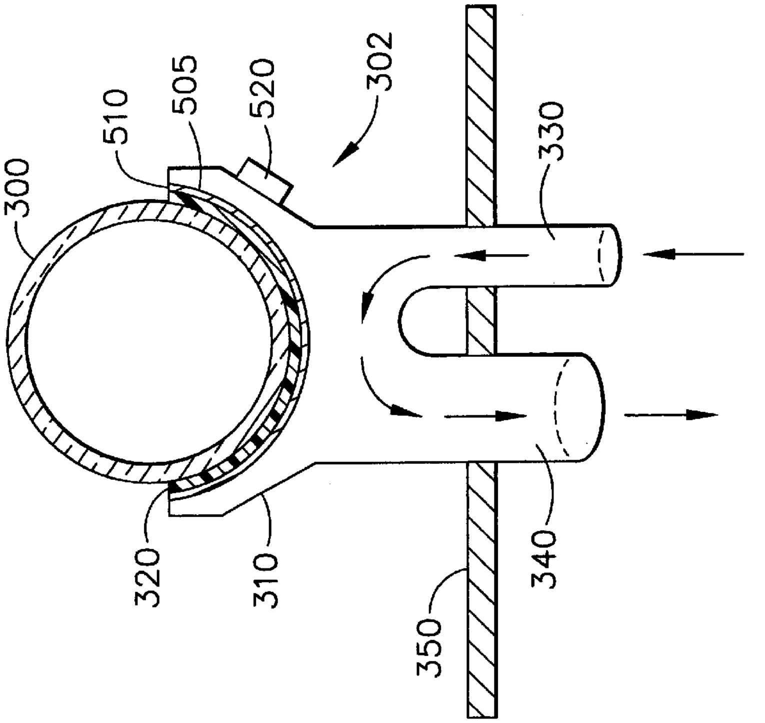
FIG. 5 illustrates an enlarged cross sectional view of an alternative embodiment of the cooling system in accordance with the present invention.

Referring now to FIGS. 5 and 6, the cold spot regulation system 302 suitably further comprises a lamp heating system 505 adjacent the lamp body 300. The lamp heating system 505 is suitably disposed at the point of the lamp body 300 at which the cold spot is desired within the light emitting enclosure 300, or may alternatively be disposed around other parts of the light emitting enclosure 300. For example, a lamp heating system 505 may comprise a resistive heater 510, such as a copper nickel wire wrapped around the light emitting enclosure 300 near the cold spot area. In another embodiment, a thin film resistive heater may be adhered to the surface of the light emitting enclosure 300 near the cold spot area.

The cold spot regulation system 302 further suitably comprises a temperature sensor 520. The temperature sensor 520 is suitably located near the cold spot of the lamp to monitor the cold spot temperature. In the present embodiment, temperature sensor 520 effectively and accurately monitors a range of temperatures from −40° C. to 120° C. For example, temperature sensor 520 may be, but is not limited to, a solid state current modulating sensor or a thermistor. A control circuit (not shown) receives the temperature readings from the temperature sensor 520 via lead wires 620 and energizes a direct current (DC) power supply 600 shown in FIG. 6. Resistive heater 510 is supplied power via lead wires 610. Through a feedback loop, the temperature sensor 520, the lamp heating system 505, and the cold spot cooling system 360 may effectively maintain the optimal cold spot temperature.

Figure 7:
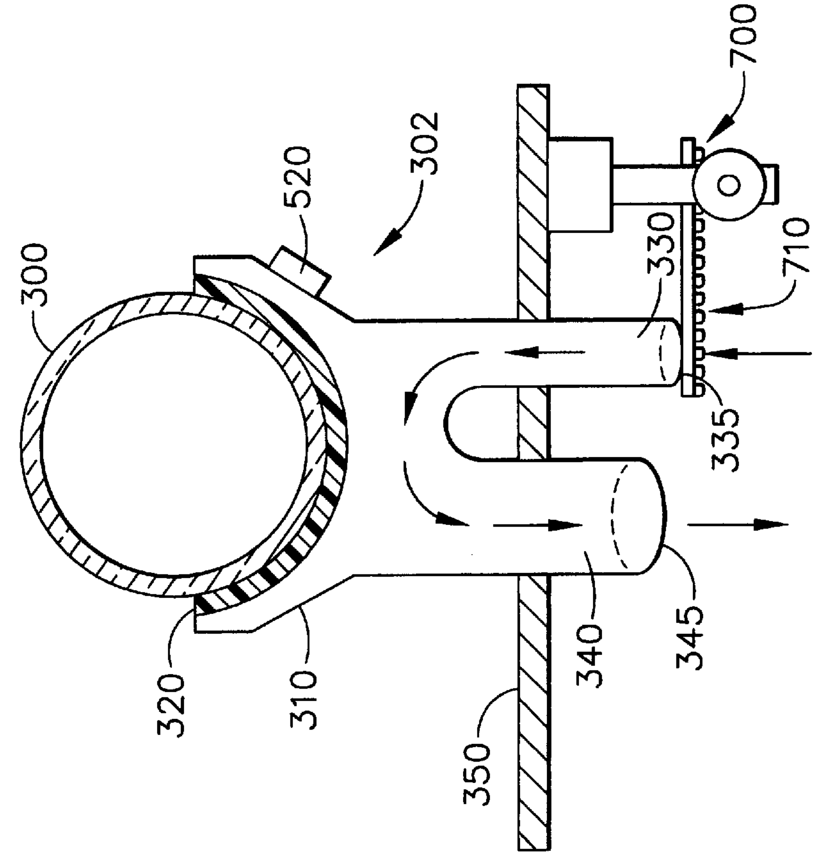
FIG. 7 illustrates an enlarged cross sectional view of another embodiment of the cooling system in accordance with the present invention.

Referring to FIG. 7, an alternative embodiment of the cold spot regulation system 302 includes an airflow regulation device 700. The airflow regulation device 700 may be used in addition to or instead of the lamp heating system 505. The airflow regulation device 700 is suitably configured to regulate the amount of airflow into the intake end 335 of the intake duct 330. FIG. 7 discloses an example of one such form. The airflow regulation device 700 may be secured to backplate 350 and extend parallel to the intake duct 330. As shown, a sliding attachment 710 is perpendicular to intake end 335, though the airflow through the ducts 330, 340 may be regulated at any point in either duct, such as at the exhaust end 345. A control circuit (not shown) receives temperature readings from temperature sensor 520 and energizes a power supply (not shown) to the airflow regulation device 700. If the temperature reading is below the desired operating temperature, the control circuit moves the sliding attachment 710 across the opening of intake end 335, thereby closing the opening of intake duct 330 to effectively reduce the amount of airflow circulating. Similarly, if the temperature reading is above the desired temperature, the control circuit moves the sliding attachment 710 to open the intake duct 330 and increase the amount of circulating cool air.

Figure 8:
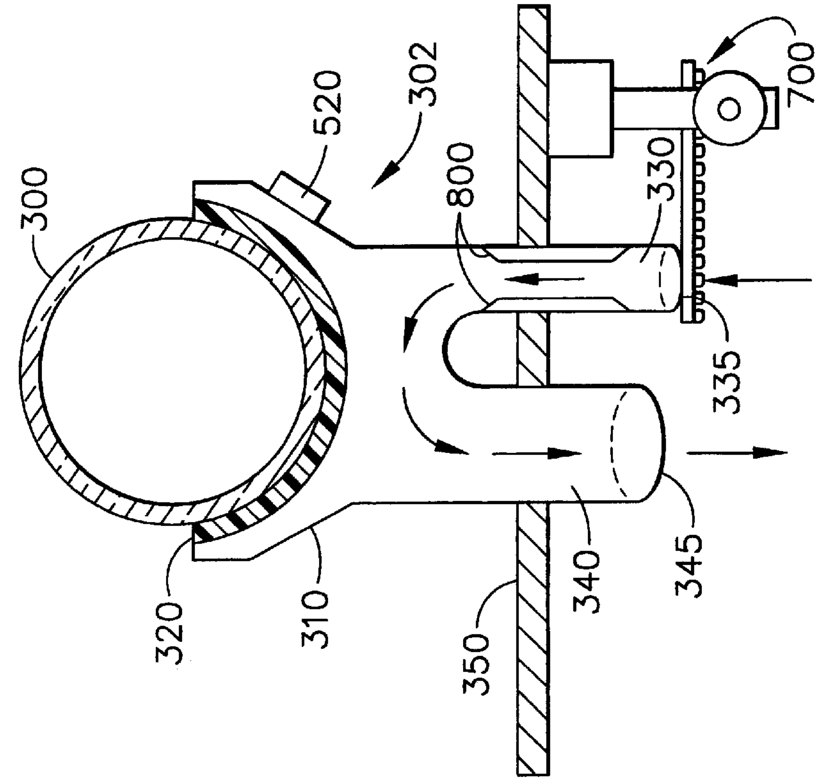
FIG. 8 illustrates an enlarged cross sectional view of yet another embodiment of the cooling system in accordance with the present invention.

The configuration of the ducts 330, 340 may also be modified to affect the circulation of the coolant fluid. For example, referring to FIG. 8, another embodiment of the cold spot regulation system 302 in accordance with various aspects of the present invention includes the intake duct 330 suitably configured to increase the airflow speed. In the present embodiment, the intake duct includes a Venturi tube to increase the speed of the coolant fluid. The Venturi tube is formed by constricting the airflow through the intake duct 330. As shown in FIG. 8, the intake duct 330 includes a constricting member 800 on the inside wall of tube portion 330. The force of the air stream into the cold spot regulation system 302 may be effectively increased, thereby accelerating the cooling of lamp body 300.

FIG. 8 further illustrates airflow regulation device 700 in conjunction with constricting member 800. The airflow regulation device 700 may operate in substantially the same manner as described above. However, with the Venturi tube, cooling the lamp body 300 may require less airflow through the intake end 335. This may be particularly useful during aircraft or spacecraft start up when air speeds are at a minimum and at higher altitudes as air pressure begins to decrease. As the aircraft ascends and gains speeds, device 700 may be closed as needed to reach the optimal operating temperature.

The present invention has been described above with reference to preferred embodiments. However, changes and modifications may be made to the preferred embodiments without departing from the scope of the present invention. These and other changes or modifications are intended to be included within the scope of the present invention, as expressed in the following claims.

What is claimed is:

1. A cold spot regulation system for regulating the temperature of a cold spot of a light emitting enclosure within a housing, said system comprising:

(a) an interface housing positioned within said housing and adjacent to the cold spot;

(b) an intake duct disposed through the housing and connected to said interface housing, wherein said intake duct includes an intake end configured to receive a coolant fluid flow;

(c) an exhaust duct connected to said interface housing, wherein said exhaust duct includes an exhaust end configured to release said coolant fluid flow;

(d) a heating mechanism contiguous with said system, said heating mechanism increasing the temperature of said cold spot;

(e) a power supply coupled to said heating mechanism for delivering operational power to said heating mechanism; and (f) a temperature sensor coupled to said power supply and monitoring the temperature of said cold spot.

2. The system of claim 1 wherein said heating mechanism comprises an air flow regulation device, said device being configured to open and close to allow coolant fluid flow to enter said intake duct.

3. The system of claim 1 wherein said heating mechanism comprises a resistive heater.

4. The system of claim 3 wherein said resistive heater comprises a copper nickel wire.

5. The system of claim 3 wherein said resistive heater comprises a thin film resistive heater.

6. A method for regulating the temperature of a cold spot of a fluorescent discharge lamp member comprising the steps of:

(a) Securing a control mechanism to said lamp member, wherein said control mechanism defines said cold spot of said lamp member;

(b) Introducing a cool forced air into a first tube of said control mechanism;

(c) Passing said cool forced air near said cold spot of said lamp member;

(d) Monitoring the temperature of said cold spot with a temperature sensor;

(e) Warming said lamp member to a substantially optimum operating temperature; and (f) Releasing said cool forced air from a second tube of said control mechanism that is contiguous with said first tube.

7. The method of claim 6 further comprising the step of constricting said cool forced air within said first tube of said control mechanism.

8. The method of claim 6 further comprising the step of regulating the flow of said cool forced air into said first tube of said control mechanism.

9. A method for optimizing illumination in a fluorescent discharge lamp by maintaining an optimal operating temperature comprising the steps of:

(a) Securing a first portion of a control mechanism for regulating temperature to a portion of said lamp;

(b) Diverting a cool forced airstream into a first end of said control mechanism so that cool air is passed by said lamp portion;

(c) Regulating, the flow of said airstream into said first end;

(d) Monitoring the temperature of said portion of said lamp;

(e) Controlling the operational power to a heating mechanism within said control mechanism in response to said monitoring step determining, said temperature is below a substantially optimum operating temperature;

(f) Warming said lamp portion; and (g) Releasing said airstream from a second end of said control mechanism which is contiguous with said first end.

10. A control mechanism for regulating the temperature of a cold spot of a fluorescent lamp located within a housing, the control mechanism comprising:

(a) a cold spot mechanism sealed to said lamp and defining a cold spot for said lamp, said cold spot mechanism comprising, (a) a first portion shaped to fit around said lamp, (b) a first hollow tube portion extending from said first portion and having an open end portion configured to receive an airflow, and (c) a second hollow tube portion extending from said first portion and continuous with said first tube portion, said second tube portion having an open end portion larger than said first tube open end portion and being configured to release said airflow, (b) a heating mechanism continuous with said cold spot mechanism and increasing the temperature of said cold spot;

(c) a power supply coupled to said heating mechanism for delivering operational power to said heating mechanism; and (d) a temperature sensor located on said first portion of said cold spot mechanism and coupled to said power supply, said temperature sensor monitoring the temperature of said cold spot.

11. The control mechanism of claim 10 wherein said heating mechanism is an airflow regulation device having a sliding attachment that is perpendicular to said first tube portion open end configured to receive an airflow, said sliding attachment moving to regulate the amount of airflow entering said first tube portion open end.

12. The control mechanisms of claim 10 wherein said first tube portion comprises a constricting member on an inside of said first tube portion.

13. The control mechanism of claim 11 wherein said first tube portion comprises a constricting member within said first tube portion.

14. The system of claim 1 wherein said system is secured to said light emitting enclosure by a sealant.

15. The system of claim 14 wherein said sealant is a two-part thermally conductive epoxy.

16. The system of claim 1 comprising a thermally conductive material.

17. The system of claim 16 further comprising a temperature resilient material.

18. The system of claim 1 wherein comprising a thermally conductive and temperature resilient material suitable for temperatures in the range of –40° C. to 120° C.

19. The system of claim 1 wherein said system is made from a material chosen from the group consisting essentially of metal, plastic, resin or rubber.

20. The system of claim 1 wherein said intake end is smaller in diameter than said exhaust end.

21. The system of claim 1 wherein said intake end and said exhaust end are shaped to increase the amount of fluid flow.

22. The system of claim 1 wherein said intake duct comprises a venturi tube formed from a constricting member on an inside of said intake duct.

* * * * *